United States Patent
Ilgenfritz et al.

(10) Patent No.: US 12,520,826 B2
(45) Date of Patent: Jan. 13, 2026

(54) DEVICE FOR VACUUM-FREE REMOVAL OF A NEST FROM A TUB, A SYSTEM AND A STERILE CHAMBER COMPRISING SUCH A DEVICE, AND A METHOD FOR VACUUM-FREE REMOVAL OF A NEST FROM A TUB

(71) Applicant: Syntegon Technology GmbH, Waiblingen (DE)

(72) Inventors: Markus Ilgenfritz, Feuchtwangen (DE); Ulrich Krauß, Ilshofen (DE); Stefan Nagler, Unterschneidheim (DE); Samuel Stegmeier, Kreßberg (DE)

(73) Assignee: Syntegon Technology GmbH, Waiblingen (DE)

( * ) Notice: Subject to any disclaimer, the term of this patent is extended or adjusted under 35 U.S.C. 154(b) by 258 days.

(21) Appl. No.: 18/503,415

(22) Filed: Nov. 7, 2023

(65) Prior Publication Data

US 2024/0147967 A1     May 9, 2024

(30) Foreign Application Priority Data

Nov. 8, 2022   (DE) .................... 10 2022 129 528.1

(51) Int. Cl.
*A01K 31/00*   (2006.01)
*A01K 31/16*   (2006.01)
*B65B 55/02*   (2006.01)

(52) U.S. Cl.
CPC ............ *A01K 31/16* (2013.01); *B65B 55/027* (2013.01)

(58) Field of Classification Search
CPC ........ A01K 31/16; B65B 43/46; B65B 55/027
See application file for complete search history.

(56) References Cited

U.S. PATENT DOCUMENTS

| | | |
|---|---|---|
| 2005/0151385 A1 | 7/2005 | Kellar et al. |
| 2017/0121046 A1* | 5/2017 | Diaz ....................... B65B 57/06 |
| 2018/0282069 A1 | 10/2018 | Frumkin |
| 2021/0403252 A1 | 12/2021 | Crum et al. |

FOREIGN PATENT DOCUMENTS

| | | | | |
|---|---|---|---|---|
| DE | 102010012567 A1 | * | 9/2011 | ............. B60R 1/078 |
| DE | 102020126552 | | 4/2022 | |
| KR | 20160023933 A | * | 3/2016 | ............ F26B 25/001 |
| WO | WO-2017062930 A1 | * | 4/2017 | ............... B65D 1/36 |
| WO | WO-2019243975 A1 | * | 12/2019 | ............ B65B 43/46 |
| WO | WO-2022073780 A1 | * | 4/2022 | ........... B65B 61/207 |
| WO | 2022185347 | | 9/2022 | |

OTHER PUBLICATIONS

Office Action for German Application No. 10 2022 129 528.1 mailed on May 22, 2023 (Statement of Relevance, 8 pages).
European Patent Office Extended Search Report and Written Opinion for Application No. 23204425.5 dated Mar. 25, 2024 (21 pages including English machine translation).

* cited by examiner

*Primary Examiner* — Eyamindae C Jallow
(74) *Attorney, Agent, or Firm* — Michael Best & Friedrich LLP

(57) ABSTRACT

A device (1) for vacuum-free removal of a nest (2) from a tub (3), a system (4) comprising a corresponding device (1), a sterile chamber in which a corresponding device (1) or a corresponding system (4) is arranged, and a method for vacuum-free removal of a nest (2) from a tub (3), are proposed.

17 Claims, 5 Drawing Sheets

DEVICE FOR VACUUM-FREE REMOVAL OF A NEST FROM A TUB, A SYSTEM AND A STERILE CHAMBER COMPRISING SUCH A DEVICE, AND A METHOD FOR VACUUM-FREE REMOVAL OF A NEST FROM A TUB

BACKGROUND

The invention relates to a device for vacuum-free removal of a nest from a tub. In addition, the present invention relates to a system comprising a corresponding device. Furthermore, the present invention relates to a sterile chamber in which a corresponding device or a corresponding system is arranged. The present invention further relates to a method for vacuum-free removal of a nest from a tub.

A nest in the present sense is a plastics carrier plate and typically serves to hold primary packaging, such as vials, syringes or carpules, in particular for medical active ingredients or other laboratory requisites, such as piston materials for syringes. For this purpose, multiple recesses or apertures are generally formed in a nest. A nest is typically handled in a plastics trough, referred to as a tub. Depending on the type of the nest, only a single nest may be received in a tub, or multiple nests is accommodated in the tub, in a manner stacked one above the other.

Typically, the tub and nest are handled in an automated manner in a sterile environment. Removing a nest from a tub represents a demanding handling step because the nest is arranged lowered in the tub. A gripper would therefore have to reach into the tub in order to remove the nest. In view of its function, a device for removing a nest from a tub is also referred to as a nest lifter.

Conventionally, a nest is removed from the tub by means of a vacuum-based device. Such a vacuum-based device suctions the nest during removal, with the aid of vacuum. For this purpose, the device comprises a suction frame having vacuum channels formed therein. Multiple spacer sleeves comprising suction means are attached to the suction frame. The suction means attach firmly, by suction, onto a suction surface of the nest, and thus exert the required holding force in order that the nest can then be removed from the tub. However, vacuum-based devices have several disadvantages, which are problematic in particular when processing toxic/highly potent active ingredients. After the machine has been set up, it is generally necessary to ensure, by means of a special decontamination cycle using H2O2, that H2O2 also flows through the vacuum channels and thus decontaminates them. Since each vacuum-based device comprises multiple suction devices (frequently, 10 devices), it can be ensured only with difficulty that a sufficient amount of H2O2 passes through all the suction devices. In the case of toxic and/or highly potent active substances, a filter must also be provided, which prevents the active substances from entering the outer region through the vacuum from the sterile environment, in the form of aerosols. In the case of toxic and/or highly potent active substances, deconstructing the device also presents a challenge, since the vacuum lines are potentially contaminated with toxic filling material up to the filter, and they can barely be reached by water during the wash-down. Thus, the entire component must either be packaged manually by the operator, using gloves, into a sealed bag, and cleaned separately later, or be automatically discharged, e.g. by a robot, via an RTP port having a docked container. Vacuum-based devices also have the disadvantage that the use of a negative pressure unit for generating the vacuum is necessary. This consumes energy, as a result of which the operating costs are increased. Furthermore, the use of a vacuum-based device also results in problems when one of the suction devices does not contact the suction surface of the nest or contacts it only in part. The suction device in question then draws in false air, as a result of which the holding force at the other suction devices is also reduced. A similar effect also occurs in vacuum-based devices when the nest to be suctioned has a hole or another irregularity in the region of one of the suction devices.

Devices for vacuum-free removal of a nest from a tub are also known from practice. The known vacuum-free devices have multiple receiving units designed as latching units, between which the nest to be removed can latch. By means of such a vacuum-free device, at least some of the disadvantages explained in connection with the vacuum-based devices can be overcome. However, only those nests which have suitable recesses for the latching units can be removed from tubs. However, such recesses are generally not present in the case of nests which are arranged stacked on top of one another in a tub. In addition, the separation of the latched nest from the device is relatively complex. The automated separation typically requires an expensive six-axis robot having corresponding degrees of freedom during the movements. Pulling of the latched nest out of the device by means of a more inexpensive four-axis robot is significantly more difficult because tilting of the nest is required for this.

SUMMARY

The object of the invention is to provide a possibility of removing a nest from a tub in a sterile environment, wherein it is intended for both simple operability and in particular an option for cleaning of the device, and low structural demands on the nest, to be provided.

This object is achieved according to the invention by a device, a system, a sterile chamber, and a method.

The description indicates advantageous variants and embodiments.

According to the invention, a device for vacuum-free removal of a nest from a tub is therefore provided. The device comprises an, in particular frame-like, supporting structure.

The device further comprises at least one, in particular elongate, receiving unit. The receiving unit can, for example, be in the form of a pin or a punch. The receiving unit is arranged on the supporting structure and extends away from the supporting structure. As mentioned above, the supporting structure can be designed to be frame-shaped. The receiving unit is then preferably arranged on the frame-shaped supporting structure such that it extends perpendicularly to a plane defined by the frame-shaped supporting structure. At least during the removal of the nest from the tub, the receiving unit typically extends downwards in the vertical direction.

It is now provided that at least one adhesive element is arranged on an end face of the receiving unit facing away from the supporting structure, and that the adhesive element is designed to be adhesion-structured for the adhesive capture of the nest.

Adhesive capture means capture by adhesion forces. Adhesion forces are molecular attractive forces which act between touching surfaces. In order to be able to apply sufficiently high adhesive forces for removal of the nest, according to the invention the adhesive element is designed to be adhesion-structured. In this respect, the adhesive element is to be distinguished from such adhesive elements which have an unstructured adhesive layer for adhesive capture. Adhesion-structured adhesive elements per se are known in principle. In the case of adhesion-structured adhesive elements, the adhesion forces are typically formed at least substantially by Van der Waals forces. The adhesion-structured adhesive element according to the invention can have, for example, a microstructure and/or a mesostructure. The adhesive element is preferably manufactured from a polymer, particularly preferably from silicone. In order to remove the nest, the adhesion-structured adhesive element and an adhesion surface of the nest can be pressed against one another. This results in said adhesion forces being formed between the adhesive element and the adhesion surface of the nest, so that the nest is adhesively captured. If the nest is adhesively captured, the nest can be removed from the tub by the device, the nest being adhesively held on the adhesive element by the adhesion forces.

The device according to the invention can be operated and cleaned in a simple manner, which results in particular from the vacuum-free embodiment of the device. Specifically, the individual components of the device can be designed such that they can be treated or also autoclaved without problems using conventional pharmaceutical cleaning and disinfectant agents. In comparison with the above-described vacuum-free devices in which receiving units designed as latching units are present, the advantage additionally results that no recesses for the latching units have to be present in the nest. Rather, by means of the device according to the invention, nests of virtually any design or shape can be removed from tubs. Furthermore, a removed nest can also be easily detached from the adhesive element again, in particular by means of an inexpensive four-axis robot. For example, the nest can be detached from the adhesive element by overpressure, by a tilting movement, by a shearing movement or by a rotational movement. A further advantage is that, after detachment of the nest, no residues remain on the nest. In addition, no particles are generated which could arise due to mechanical friction between the nest and components of the device.

According to a preferred embodiment, the adhesive element comprises a plurality of elastically deformable adhesive projections. As a result of the elastically deformable adhesive projections, slight unevenness of the nest or of the adhesive element can be compensated, in order to realize a large contact area between the adhesive element and the nest. Various embodiments are possible with regard to the shape of the adhesive projections. The adhesive projections are preferably of column-shaped design. A column-shaped adhesive projection has an at least substantially constant, in particular circular, cross section. Alternatively, the adhesive projections are preferably mushroom-shaped. In the case of a mushroom-shaped adhesive projection, the cross-sectional area of a contact portion for contacting the adhesion surface is larger than the cross-sectional area of a support portion carrying the contact portion.

Preferably, a diameter of the adhesive projections is less than 1 mm. Adhesive projections of such small dimensions can effectively compensate for unevenness, so that an adhesive element is obtained in such a way that high adhesive forces can form. The diameter of the adhesive projections is preferably less than 500 µm, particularly preferably less than 200 µm.

The adhesive element is preferably an adhesive film. An adhesive element designed as an adhesive film has the advantage that the dimensioning of the adhesive element can easily be adapted to the dimensioning of the end face of the receiving unit and/or the dimensioning of the adhesion surface of the nest available for contacting. For example, the adhesive film is cut to desired dimensions for this purpose. In addition, the shape of an adhesive film can also be adapted to an uneven, in particular curved, end face of the receiving unit. The adhesive film has a first end face and a second end face facing away from the first end face. The first end face is preferably designed to be adhesion-structured, and the second end face is fastened to the end face of the receiving unit by an adhesive connection.

Preferably, the receiving unit is designed such that it can be shortened in a resilient manner along its longitudinal center axis, in particular by means of a spring mechanism, which in particular comprises a spring travel limitation. This facilitates the capture of the nest. This is due to the fact that the requirements for the positioning accuracy of the nest are reduced. If the receiving unit can be resiliently shortened, the receiving unit can compensate inaccuracies with regard to the positioning of the nest by means of deflection. In addition, the advantage results that undesired overpressure of the adhesive structure of the adhesive element can be avoided. Overpressure describes the effect that the adhesive element and the nest are pressed against one another so strongly that the adhesive projections of the adhesive element bend. The end faces of the adhesive projections then extend obliquely to the adhesion surface of the nest, so that at most reduced adhesive forces can act. This effect occurring during overpressure is also referred to as "Euler's critical load."

Preferably, the receiving unit is detachably fastened to the supporting structure, in particular by at least one fastening means, such as a fastening screw. This has the advantage that the arrangement of the receiving unit on the supporting structure and the number of receiving units arranged on the supporting structure can be easily changed. For example, the arrangement and the number can be adapted to the structural design of the nest to be removed.

Preferably, the device comprises multiple, in particular elongate, receiving units which are arranged distributed on the supporting structure and extend away from the supporting structure in the same direction, at least one adhesive element being arranged on each of the end faces of the receiving units facing away from the supporting structure. Features disclosed above and below with reference to the at least one receiving unit are preferably also realized in the further receiving unit or the further receiving units. The presence of multiple receiving units has various advantages. Firstly, the adhesion forces acting overall can be increased by multiple receiving units compared with only one receiving unit. In addition, the nest can be adhesively captured at different locations at the same time, so that the adhesive forces act on the adhesion surface in a manner distributed along the adhesion surface of the nest. As a result, undesired "tilting" of the nest can be prevented. Preferably, the receiving units are of equal length, so that the adhesive elements of the different receiving units are arranged at the same height. As mentioned above, the supporting structure is preferably formed in the shape of a frame. The multiple receiving units is then preferably distributed, in particular evenly distributed, in the peripheral direction of the frame-shaped supporting structure. In a particularly preferred embodiment, the supporting structure is rectangular frame-shaped having four legs, two receiving units being arranged in each case on each of the legs of the rectangular frame-shaped supporting structure.

The device preferably comprises at least one centering unit, in particular in the form of a pin, which is arranged on the supporting structure and extends away from the supporting structure, an end of the centering unit facing away from the supporting structure having a guide surface, in particular extending obliquely relative to the end face, for positioning the nest relative to the supporting structure. By means of the at least one centering unit, the nest can be pre-positioned exactly before the adhesive capture. This is important, for example, when the nest is intended to be transported further after removal from the tub or is to be exactly positioned in a station for further processing. Preferably, the guide surface projects beyond the adhesive element arranged on the receiving unit. As a result, initial pre-positioning of the nest by the guide surface can be easily achieved. Only then does the adhesive element come to rest on the adhesion surface. Preferably, for positioning the nest, the guide surface interacts with an outer contour of the nest, with a recess of the nest, or with an opening of the nest.

Preferably, the device comprises a sensor unit which is designed to detect a nest which is adhesively captured by the adhesive element. Successful removal of the nest can be determined by means of the sensor unit. For example, the sensor unit is designed as a radiation sensor, in particular a camera sensor or laser sensor. Alternatively, the sensor unit is designed, for example, as a force sensor and is integrated in the device in such a way that the weight force of the captured nest acts on the force sensor. A sensor unit designed as a force sensor has the advantage that the contact force with which the adhesion surface of the nest and the adhesive element are pressed together can also be monitored by means of the sensor unit. This makes it possible to detect or prevent an undesired overpressure of the adhesive element during the capture of the nest.

The device can comprise a handling device which is designed to move the tub, together with the nest located therein, towards the receiving unit, and to press the adhesion surface of the nest against the adhesive element. The handling device is preferably designed to grip around the tub. In this embodiment of the device, the support structure having the receiving unit arranged thereon is preferably stationary. This facilitates the pressing of the adhesion surface onto the adhesive element. For example, the supporting structure is fastened to a stationary stand.

The device can alternatively comprise a handling device which is designed to move the supporting structure towards the nest located in the tub and to press the adhesive element against the adhesion surface of the nest. This embodiment of the device has the advantage that removal of the nest can also be carried out easily when gripping of the tub is made more difficult, for example because the tub has a low stiffness. The handling device is preferably designed to grip around the supporting structure.

The object to be achieved is further achieved by a system according to the disclosure. The system comprises a device having the above-described features, at least one nest comprising an adhesion surface, and at least one tub for receiving the nest.

With regard to the advantages that can be achieved by means of the system, reference is made to the statements in this regard relating to the device or the method. The features described in connection with the device or the method can serve for developing the system.

According to a preferred embodiment of the system, it is provided that the device comprises multiple, in particular elongate, receiving units which are arranged on the supporting structure such that the adhesive elements arranged on the end faces of the receiving units can simultaneously contact the adhesion surface. As a result, the nest can be captured and removed particularly reliably. In this case, the adhesion surface can be a coherent surface. However, the adhesion surface can also be composed of multiple partial surfaces separated from one another. Preferably, the adhesion surface is formed by a peripheral horizontally extending edge of the nest. The feature "horizontally extending" relates here to the extension of the edge during the removal of the nest from the tub.

The object to be achieved is further achieved by a sterile chamber according to the disclosure. A device having the features described above or a system having the features described above is arranged in the sterile chamber.

With regard to the advantages that can be achieved by means of the sterile chamber, reference is made to the statements in this regard relating to the device or the method. The measures described in connection with the device or the method can serve for developing the sterile chamber. A sterile chamber in the sense of the invention is an apparatus in which a closed or predominantly closed controlled atmosphere is provided, for example an isolator or an enclosure which is open in regions, which has an inner region under overpressure, so that a controlled atmosphere prevails in the interior.

The object to be achieved is also achieved by a method for vacuum-free removal of a nest from a tub, the method comprising the following steps:

providing a device which comprises at least one, in particular frame-shaped, supporting structure, and at least one, in particular elongate, receiving unit which is arranged on the supporting structure and extends away from the supporting structure. At least one adhesive element is arranged on an end face of the receiving unit facing away from the supporting structure, which adhesive element is designed to be adhesion-structured for the adhesive capture of the nest.

Pressing together the adhesive element and an adhesion surface of the nest so that the adhesion surface is adhesively captured by the adhesive element.

Removing the nest from the tub and detaching the nest from the adhesive element.

Advantages and possible developments of the device are to be understood as also being described in relation to the method, and vice versa, advantages and possible developments of the method are to be understood as also being described in relation to the device.

Various embodiments of the method are possible with regard to the pressing together of the adhesive element and the adhesion surface of the nest. In a preferred first embodiment, the adhesion surface is pressed against the stationary adhesive element. In a preferred second embodiment, the adhesive element is pressed against the adhesion surface of the stationary nest. In a third embodiment, the adhesive element and the nest are moved toward one another so that neither the adhesive element nor the nest is stationary.

Preferably, the nest is detached from the adhesive element by overpressure, by a tilting movement, by a shearing movement or by a rotational movement. These procedures can be carried out easily, for example by means of an inexpensive four-axis robot. During overpressure, the nest and/or the receiving unit are subjected to a force which is directed counter to the adhesion force. In the case of a sufficiently high force, this results in the adhesive structure, in particular the elastically deformable adhesive projections, being deformed such that the adhesive force is released. A tilting movement is a rotation about an axis aligned in parallel with the adhesion surface of the nest. A shearing movement is a displacement along an axis oriented in parallel with the adhesion surface of the nest. A rotational movement is a rotation about an axis oriented perpendicularly to the adhesion surface of the nest.

BRIEF DESCRIPTION OF THE DRAWINGS

The invention is described in more detail below with reference to the figures, the same or functionally equivalent elements possibly being provided with reference signs only once. The description serves as an example and is not to be understood as limiting.

DETAILED DESCRIPTION

Figure 1:
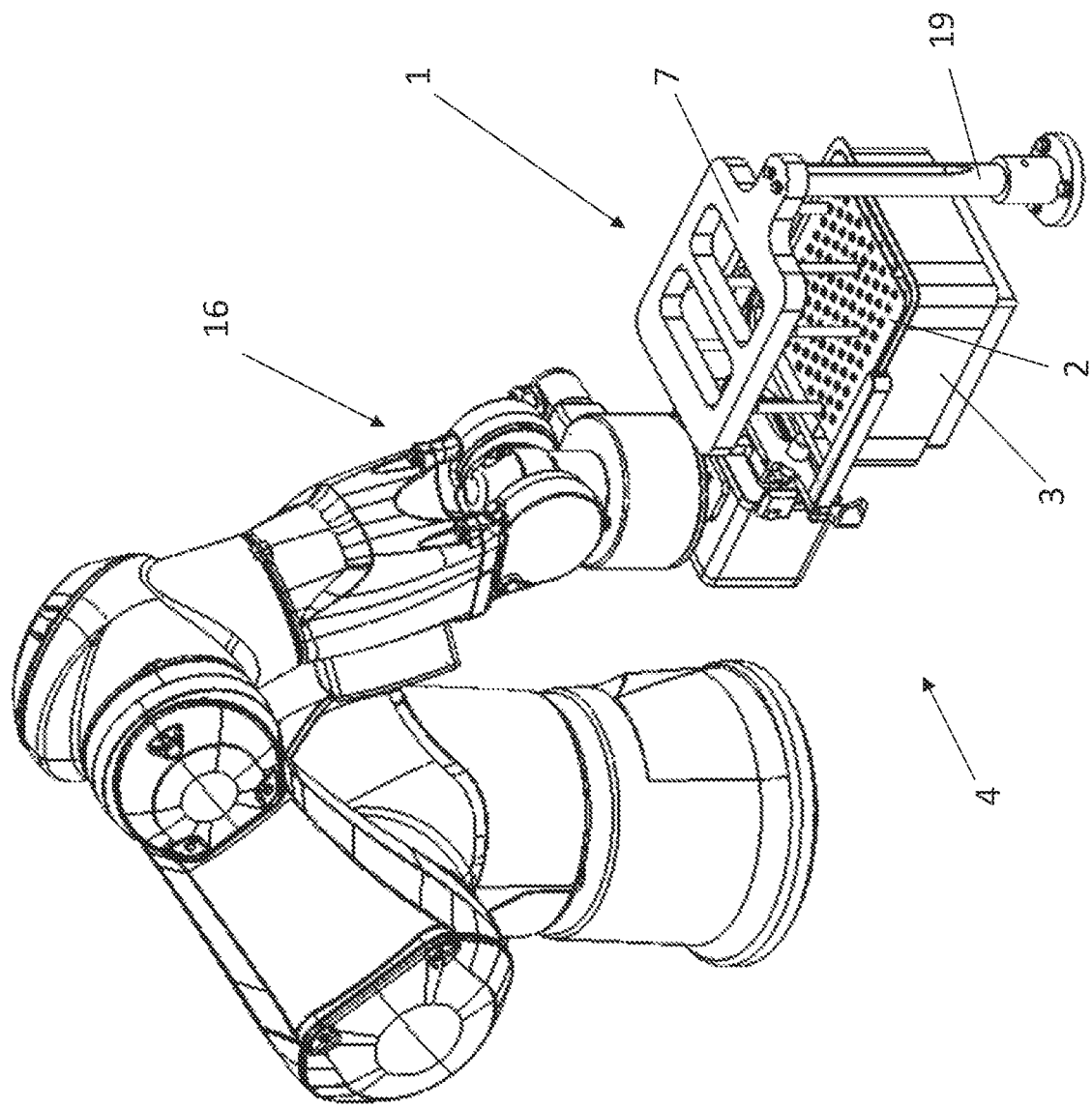
FIG. 1 a perspective view of a device for removing a nest from a tub.
Figure 2:
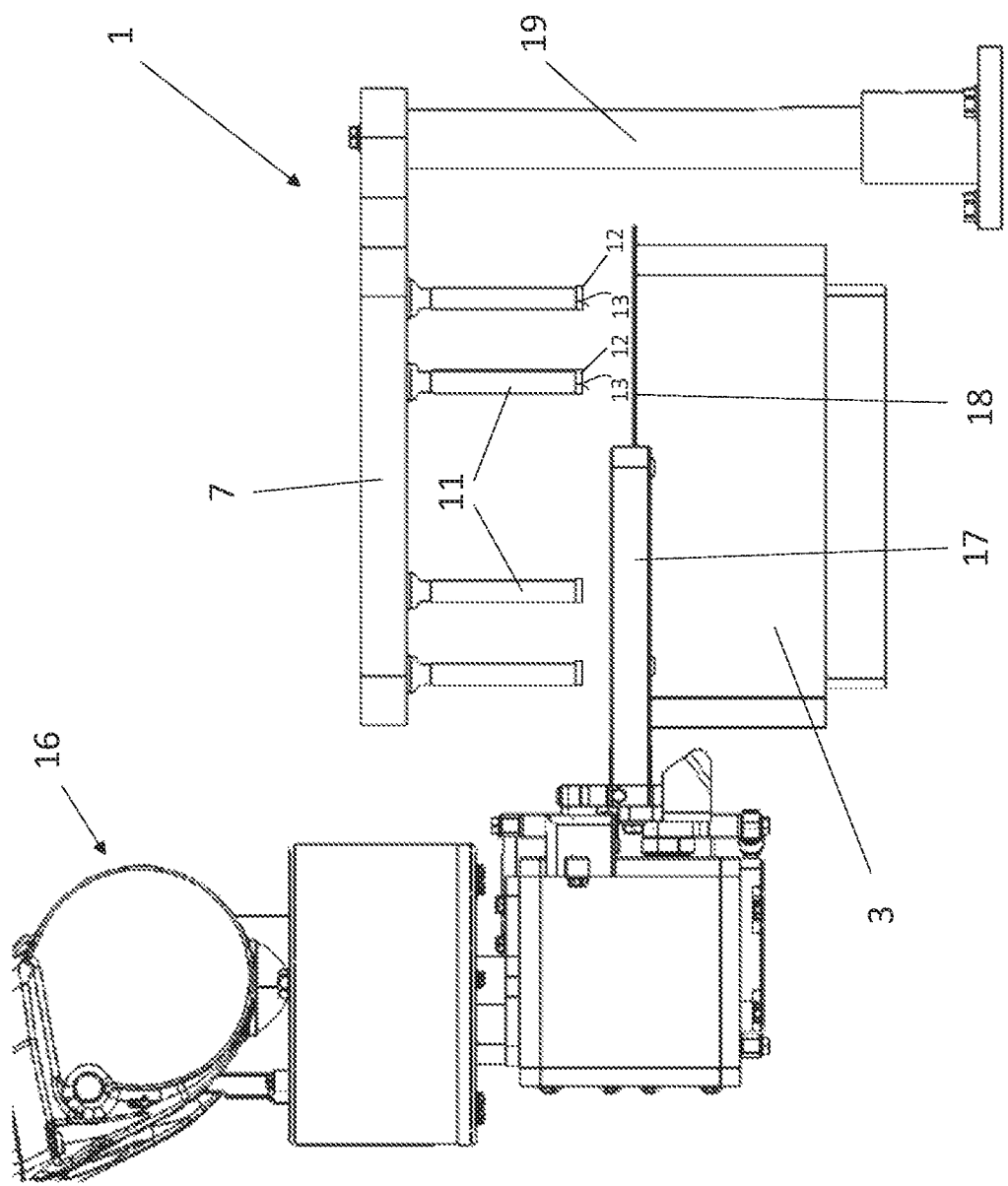
FIG. 2 a side view of the device from FIG. 1.
Figure 3:
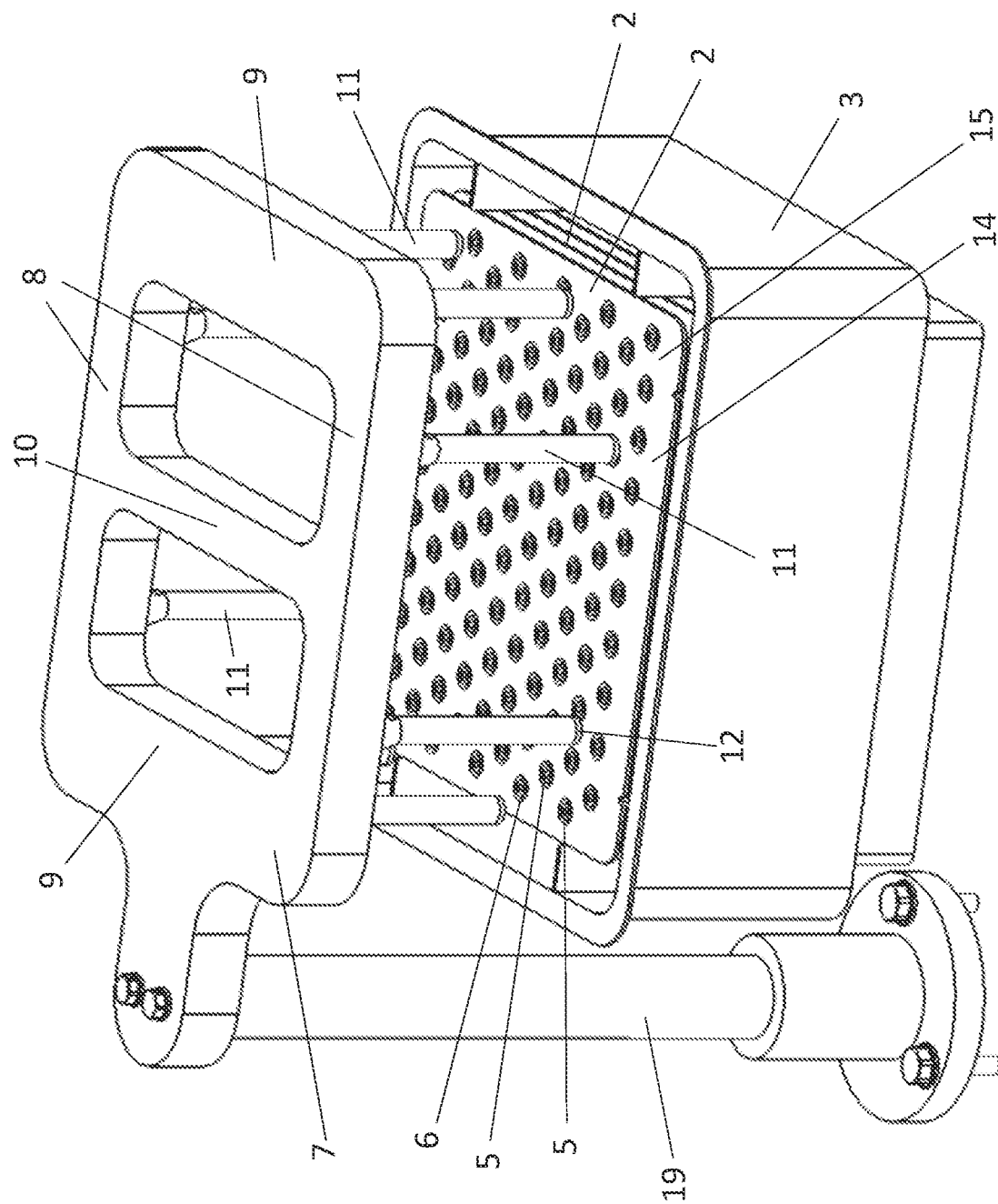
FIG. 3 a detail view of the device from FIG. 1.
Figure 4:
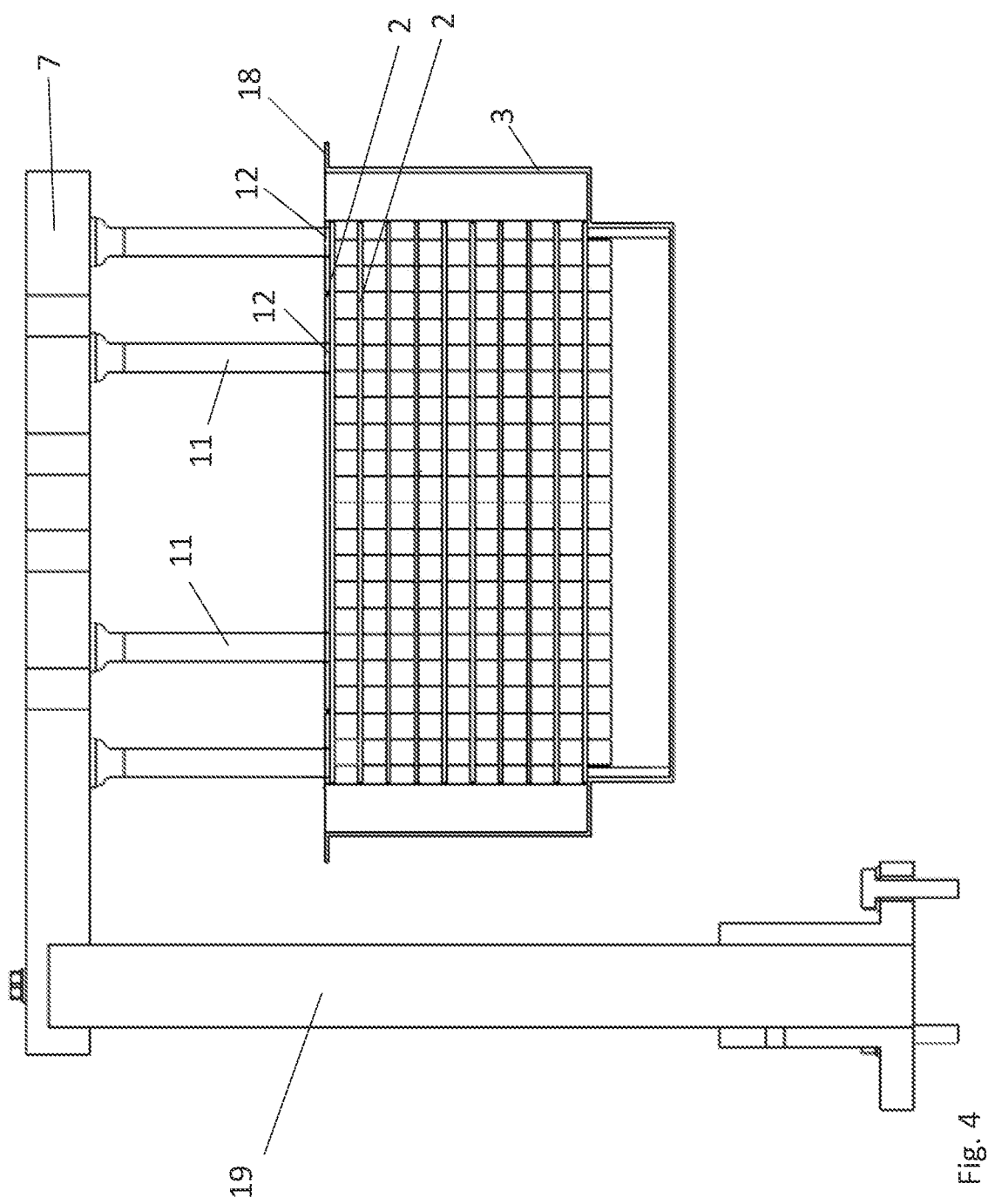
FIG. 4 a sectional view of the device when removing the nest.

FIGS. 1 to 4 show a device 1 for removing a nest 2 from a tub 3. In this case, FIG. 1 shows a perspective view of the device 1. FIG. 2 shows a side view of the device 1. FIG. 3 shows a perspective detail view of the device 1. FIG. 4 shows a sectional view of the device 1 during the removal of the nest 2. The device 1, the nest 2 and the tub 3 together form a system 4. The system 4 comprising the device 1 is preferably arranged in a sterile chamber (not shown in greater detail) so that the removal of the nest 2 from the tub 3 by means of the device 1 takes place under sterile conditions.

The tub 3 is trough-shaped and is made of plastics material. In the embodiment shown in FIGS. 1 to 4, multiple nests 2 is received in a stacked manner in the tub 3. Alternatively, only one nest 2 is received in the tub 3, the nest 2 then typically having a greater height extension than the nest 2 shown by way of example in the figures. The nests 2 are plate-shaped and made of plastics material. Typically, such nests serve to hold primary packaging or other laboratory requisites. In the present case, piston plugs 5 are held in the nests 2. Each of the piston plugs 5 is arranged in a different recess 6, respectively, of one of the nests 2.

The device 1 has a frame-shaped supporting structure 7. In the present case, the supporting structure 7 is designed in a rectangular frame-shaped manner. Accordingly, the supporting structure 7 has two first legs 8 extending in parallel with one another, and two second legs 9 extending in parallel with one another. The second legs 9 extend perpendicularly to the first legs 8. In the present case, the longitudinal extension of the first legs 8 is greater than the longitudinal extension of the second legs 9. The first legs 8 are connected to one another by a support strut 10 of the supporting structure 7.

Multiple elongate receiving units 11 is arranged on the supporting structure 7. In the present case, the receiving units 11 are pin-shaped. The receiving units 11 extend away from the supporting structure 7. In the present case, the receiving units 11 are arranged on the supporting structure 7 such that they extend perpendicularly to a plane defined by the frame-shaped supporting structure 7. The legs 8 and 9 of the supporting structure 7 extend in said plane. In the embodiment shown in FIGS. 1 to 4, a total of eight receiving units 11 are present. The receiving units 11 are arranged on the supporting structure 7 in a manner distributed in the peripheral direction of the frame-shaped support structure 7. Two of the receiving units 11, in each case, are arranged on each of the legs 8, 9. However, a different number of receiving units 11 can also be present. According to a further embodiment, only one receiving unit 11, in each case, is arranged on each of the legs 8, 9. According to yet another embodiment, the first legs 8 or the second legs 9 are free of receiving units 11.

Each of the receiving units 11 has at least one adhesive element 12 in each case, which adhesive element is designed to be adhesion-structured for the adhesive capture of a nest 2. The adhesive elements 12 are arranged on end faces 13 of the receiving units 11 facing away from the supporting structure 7. In the present case, the adhesive elements 12 are dimensioned such that they cover the entire surface area of the end face 13 in question. Alternatively, multiple adhesive elements 12, which are arranged in a distributed manner on the end face 13 of the receiving unit 11 in question, can also be arranged on one of the receiving units 11 or multiple of the receiving units 11. In the present case, the adhesive elements 12 are formed as adhesive films 12.

The adhesive structure of the adhesive elements 12 is preferably formed by a plurality of elastically deformable adhesive projections. Preferably, a diameter of the adhesive projections is less than 1 mm. The adhesive structure is then designed accordingly as a microstructure. Due to their dimensioning, the adhesive projections are not visible in the figures. For example, the adhesive projections are pin-shaped or mushroom-shaped.

The nests 2 each have an adhesion surface 14. The adhesion surface 14 is formed complementary to the adhesive elements 12, so that the adhesive elements 12 can simultaneously rest against the adhesion surface 14. In the present case, the adhesion surface 14 is formed by a peripheral edge 15 of the nests 2. If the adhesion surface 14 and the adhesive elements 12 are pressed together, the adhesion-structured adhesive elements 12 nestle against the adhesion surface 14. In the case of the above-mentioned adhesive projections, this occurs, for example, with elastic deformation of the adhesive projections. Adhesion forces are then formed between the adhesive elements 12 and the adhesion surface 14, so that the nest 2 is adhesively captured by the adhesive elements 12.

The device 1 furthermore has a handling device 16. In the present case, the handling device 16 is a six-axis robot 16. Alternatively, the handling device 16 is preferably a four-axis robot. The removal process described in connection with the figures can also be carried out by means of a handling device 16 designed as a four-axis robot. In the embodiment shown in the figures, the handling device 16 is designed to move the tub 3 towards the receiving units 11 and to press the adhesion surface 14 of the nest 2 onto the adhesive elements 12. For this purpose, the handling device 16 has a gripper 17. The gripper 17 is designed to grip a protrusion 18 of the tub 3. If the handling device 16 is designed to grip the tub 3, the supporting structure 7 comprising the receiving units 11 is preferably stationary. In the present case, the supporting structure 7 is fastened to a stationary stand 19 in such a way that the receiving units 11 extend vertically downwards. The frame-shaped supporting structure 7 accordingly extends horizontally.

If a nest 2 is to be removed from the tub 3 by the device 1, the procedure is preferably as follows. First, the handling device 16 grips the tub 3, together with the nests 2 located therein, by means of the gripper 17. The handling device 16 then moves the tub 3 vertically from below, towards the receiving units 11, in such a way that the adhesion surface 14 is pressed against the adhesive elements 12 at a predetermined first pressing force. In this case, the adhesion surface 14 extends horizontally. By pressing the adhesion surface 14 against the adhesive elements 12 at the first pressing force, the nest 2 is adhesively captured by the adhesive elements 12, as explained above. Subsequently, the handling device 16 moves the tub 3 vertically downwards. The nest 2 adheres to the adhesive elements 12 and is removed from the tub 3 by the movement of the tub 3.

Subsequently, the nest 2 is detached from the adhesive elements 12. This is preferably carried out by the handling device 16. For this purpose, the handling device 16 initially sets down the tub 3. Subsequently, the handling device 16 grips the nest 2, adhering to the adhesive elements 12, by means of the gripper 17, and releases the nest 2 from the adhesive elements 12. However, the nest 2 can also be detached from the adhesive elements 12 by a separate further handling device.

With regard to the detachment of the nest 2, various preferred procedures can be used which will be explained below.

In a first embodiment, the nest 2 is released from the adhesive elements 12 by overpressure. For this purpose, the nest 2 is pressed vertically upwards against the adhesive elements 12, with a predetermined second pressing force. The second pressing force is greater than the previously applied first pressing force. Pressing with the second pressing force results in the adhesive structure of the adhesive element 12 being deformed, whereby the adhesive forces are released. If the adhesive structure has the above-mentioned adhesive projections, the adhesive projections are bent by pressing with the second pressing force. The end faces of the adhesive projections then extend obliquely to the adhesion surface 14 of the nest 2. Then at most low adhesion forces act between the adhesive elements 12 and the adhesion surface.

In a second embodiment, the nest 2 is detached from the adhesive elements 12 by a tilting movement. For this purpose, the nest 2 is rotated about an axis which is oriented in parallel with the plate-shaped nest 2.

In a third embodiment, the nest 2 is detached from the adhesive elements 12 by a shearing movement. For this purpose, the nest 2 is displaced along an axis which is oriented in parallel with the plate-shaped nest 2.

In a fourth embodiment, the nest 2 is detached from the adhesive elements 12 by a rotational movement. For this purpose, the nest 2 is rotated about an axis which is oriented perpendicularly to the plate-shaped nest 2.

According to a further embodiment of the device 1, the handling device 16 is designed to move the supporting structure 7, together with the receiving units 11 arranged thereon, towards the nest 2, and to press the adhesive elements 12 against the adhesion surface 14. The nest 2 is then adhesively captured by the adhesive elements 12, as described above. Subsequently, the nest 2 is removed from the tub 3 by moving the supporting structure 7. In this embodiment of the device 1, for example a separate further handling device is present for detaching the removed nest 2. Alternatively, the handling device 16 initially arranges the supporting structure 7, together with the adhesively capture nest 2, in a stationary manner, and then itself releases the nest 2.

Figure 5:
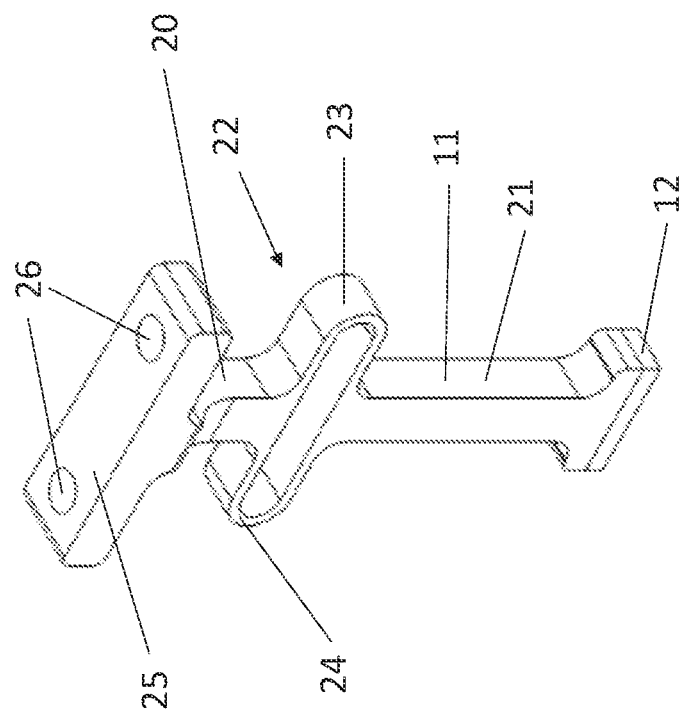
FIG. 5 a receiving unit.

FIG. 5 shows a further embodiment of the receiving unit 11. The receiving unit 11 shown in FIG. 5 is formed in the form of a punch. Accordingly, the receiving unit 11 has an enlarged cross section in the region of the end face 13. Instead of the pin-shaped receiving units 11 shown in FIGS. 1 to 4, the punch-shaped receiving unit 11 shown in FIG. 5 can also be inserted in the device 1.

The receiving unit 11 shown in FIG. 5 is designed such that it can be shortened in a resilient manner along its longitudinal center axis. For this purpose, the receiving unit 11 has two portions 20, 21, which are connected to one another by a spring mechanism 22. In the present case, the spring mechanism 22 comprises two laterally-projecting U-shaped spring elements 23, 24. The U-shaped spring elements 23, 24 are formed by milling out a central part of the receiving unit 11. The portions 20, 21 are connected to one another by the laterally projecting U-shaped spring elements 23, 24, the portions 20, 21 being spaced apart from one another in the longitudinal extension of the receiving unit 11. The portions 20, 21 can be moved towards one another with deformation of the U-shaped spring elements 23, 24, whereby the longitudinal extension of the receiving unit 11 is shortened. The spring mechanism 22 has the advantage that undesired overpressure during the adhesive capture of a nest 2 is prevented. The spring mechanism 22 can also be present in the case of the pin-shaped receiving units 11 illustrated in FIGS. 1 to 4.

The receiving unit 11 shown in FIG. 5 has a mounting flange 25 having bores 26 formed therein. The receiving unit 11 can be detachably fastened to the supporting structure 7 by means of the bores 26. This has the advantage that the number and arrangement of the receiving units 11 can be adapted to the shape of the nest 2 to be removed. The receiving units 11 shown in FIGS. 1 to 4 are also preferably detachably fastened to the supporting structure 7.

What is claimed is:

1. A device (1) for vacuum-free removal of a nest (2) from a tub (3), the device (1) comprising at least one supporting structure (7) and at least one receiving unit (11) which is arranged on the supporting structure (7) and extends away from the supporting structure (7), wherein at least one adhesive element (12) is arranged on an end face (13) of the receiving unit (11) facing away from the supporting structure (7), and wherein the adhesive element (12) is configured to be adhesion-structured for adhesive capture of the nest (2), and wherein the receiving unit (11) is configured such that it can be shortened in a resilient manner along its longitudinal center axis.

2. The device (1) according to claim 1, wherein the adhesive element (12) comprises a plurality of elastically deformable adhesive projections.

3. The device according to claim 2, wherein a diameter of the adhesive projections is less than 1 mm.

4. The device (1) according to claim 1, wherein the adhesive element (12) is an adhesive film (12).

5. The device (1) according to claim 1, wherein the receiving unit (11) is detachably fastened to the supporting structure (7).

6. The device (1) according to claim 1, wherein the device comprises multiple receiving units (11) which are arranged distributed on the supporting structure (7) and extend away from the supporting structure (7) in a same direction, at least one adhesive element (12) being arranged on each of the end faces (13) of the receiving units (11) facing away from the supporting structure (7).

7. The device according to claim 6, wherein the receiving units (11) are arranged in a uniformly distributed manner, in a peripheral direction of the frame-shaped supporting structure (7).

8. The device (1) according to claim 1, wherein the device comprises a sensor unit which is configured to detect a nest (2) which is adhesively captured by the adhesive element (12).

9. The device (1) according to claim 1, wherein the device comprises a handling device (16) which is configured to move the tub (3), having the nest (2) located therein, towards the receiving unit (12), and to press an adhesion surface (14) of the nest (2) against the adhesive element (12).

10. The device (1) according to claim 1, wherein the device comprises a handling device (16) which is configured to move the supporting structure (7) towards the nest (2) located in the tub (3), and to press the adhesive element (12) against an adhesion surface (14) of the nest (2).

11. A system (4) comprising a device (1) according to claim 1, at least one nest (2) having an adhesion surface (14) and at least one tub (3) for receiving the nest (2).

12. The system (4) according to claim 11, wherein the device (1) comprises multiple receiving units (11) which are arranged on the supporting structure (7) such that the adhesive elements (12) arranged on the end faces (13) of the receiving units (11) can simultaneously contact an adhesion surface (14).

13. The device according to claim 12, wherein the adhesion surface (14) is formed by a peripheral horizontally extending edge (15) of the nest (2).

14. A sterile chamber in which a device (1) according to claim 1 is arranged.

15. The device according to claim 1, wherein the receiving unit (11) can be shortened via a spring mechanism.

16. A method for vacuum-free removal of a nest (2) from a tub (3), the method comprising:
   a. providing a device (1) which comprises at least one supporting structure (7) and at least one receiving unit (11) which is arranged on the supporting structure (7) and extends away from the supporting structure (7), wherein at least one adhesive element (12) is arranged on an end face (13) of the receiving unit (11) facing away from the supporting structure (7), which adhesive element is configured to be adhesion-structured for the adhesive capture of the nest (2), and wherein the receiving unit (11) is configured such that it can be shortened in a resilient manner along its longitudinal center axis,
   b. pressing together the adhesive element (12) and an adhesion surface (14) of the nest (2), such that the adhesion surface (14) is adhesively captured by the adhesive element (12),
   c. removing the nest (2) from the tub (3),
   d. detaching the nest (2) from the adhesive element (12).

17. The method according to claim 16, wherein the nest (2) is released from the adhesive element (12) by overpressure, by a tilting movement, by a shearing movement or by a rotational movement.

\* \* \* \* \*